U S009809497B2

(12) United States Patent
Mania et al.

(10) Patent No.: US 9,809,497 B2
(45) Date of Patent: Nov. 7, 2017

(54) OMNIPHOBIC GROUT ADDITIVE

(71) Applicant: WACKER CHEMICAL CORPORATION, Adrian, MI (US)

(72) Inventors: Daniel J. Mania, Saline, MI (US); James D. Greene, Adrian, MI (US)

(73) Assignee: WACKER CHEMICAL CORPORATION, Adrian, MI (US)

( * ) Notice: Subject to any disclaimer, the term of this patent is extended or adjusted under 35 U.S.C. 154(b) by 8 days.

(21) Appl. No.: 14/955,441

(22) Filed: Dec. 1, 2015

(65) Prior Publication Data
US 2017/0152179 A1 Jun. 1, 2017

(51) Int. Cl.
*C04B 24/04* (2006.01)
*C04B 24/42* (2006.01)
*C04B 28/02* (2006.01)
*C04B 24/26* (2006.01)
*C04B 111/27* (2006.01)
*C04B 111/20* (2006.01)

(52) U.S. Cl.
CPC .......... *C04B 24/42* (2013.01); *C04B 24/2641* (2013.01); *C04B 24/2682* (2013.01); *C04B 28/02* (2013.01); *C04B 2111/203* (2013.01); *C04B 2111/27* (2013.01)

(58) Field of Classification Search
None
See application file for complete search history.

(56) References Cited

U.S. PATENT DOCUMENTS

| | | | | |
|---|---|---|---|---|
| 2,639,353 A * | 5/1953 | Jansson | ................. | H01H 33/08 218/37 |
| 4,045,602 A * | 8/1977 | Sommer | ............. | C09D 127/06 427/386 |
| 4,076,868 A * | 2/1978 | Roth | .................... | C04B 41/009 134/2 |
| 4,600,657 A * | 7/1986 | Wegehaupt | .......... | C04B 41/009 427/136 |
| 4,704,416 A * | 11/1987 | Eck | ........................ | C04B 28/02 106/287.12 |
| 5,063,087 A * | 11/1991 | Eck | ...................... | C04B 41/009 427/136 |
| 5,399,191 A * | 3/1995 | Mayer | ................... | C04B 41/009 106/287.11 |
| 5,527,931 A * | 6/1996 | Rich | .................. | C04B 41/4922 556/413 |
| 5,578,668 A * | 11/1996 | Colombet | .............. | C04B 24/26 524/265 |
| 5,661,196 A * | 8/1997 | Mayer | ..................... | B05D 7/06 106/287.11 |
| 5,814,411 A * | 9/1998 | Merrifield | .............. | C04B 24/42 106/677 |
| 5,962,585 A * | 10/1999 | Mayer | ..................... | C04B 24/42 106/287.11 |
| 5,985,994 A * | 11/1999 | Oberneder | .......... | B01F 17/0071 524/588 |
| 6,169,148 B1 * | 1/2001 | Deckers | .................... | C08F 8/06 525/333.8 |
| 6,294,608 B1 * | 9/2001 | Hager | ................. | C04B 41/4944 106/287.11 |
| 6,410,626 B1 * | 6/2002 | Wada | ................... | C08K 5/5419 524/266 |
| 6,492,459 B1 * | 12/2002 | Hager | ................ | C04B 41/4922 106/287.11 |
| 6,512,059 B1 * | 1/2003 | Mueller | .............. | C08K 5/5415 106/287.12 |
| 6,676,745 B2 * | 1/2004 | Merkley | ................. | C04B 18/24 106/726 |
| 6,846,852 B2 * | 1/2005 | Allen | ..................... | C08G 77/20 522/109 |
| 7,875,674 B2 * | 1/2011 | Kirkpatrick | ............. | C04B 24/42 524/588 |
| 8,455,585 B2 * | 6/2013 | Greene | ................ | C09D 123/20 106/2 |
| 2004/0219373 A1 * | 11/2004 | Deruelle | ................. | C08L 83/04 428/447 |
| 2005/0197444 A1 | 9/2005 | Kyte et al. | | |
| 2006/0025519 A1 * | 2/2006 | Desne | ..................... | C08K 3/22 524/588 |
| 2009/0274915 A1 * | 11/2009 | Kirkpatrick | ............. | C04B 24/42 428/447 |

FOREIGN PATENT DOCUMENTS

| | | |
|---|---|---|
| FR | 2639353 A1 | 5/1990 |
| WO | 04/000959 A1 | 12/2003 |
| WO | 2007/127267 A2 | 11/2007 |

OTHER PUBLICATIONS

Mania, D.J., "Stain Repellency Testing of Cementitious Grouts,", Drymix Mortar Yearbook, 2014, pp. 54-65.
Ceramic Tile Institute of America (Field Report T-72 (R02), http://www.ctioa.org, date accessed: Apr. 23, 2015, pp. 1-4.
Mania, D.J., Wacker Chemical Corporation, "Stain Repellency Testing of Cementitious Grouts" ADMMC4—Apr. 8, 2014, Atlanta Georgia, Powerpoint, pp. 1-21.
Mania, D.J., Wacker Silicones, "Integral Grout Stain Repellant Liquid Admixture", Wacker Silicones, SCC, Aug. 2014, Powerpoint, pp. 1-18.

* cited by examiner

*Primary Examiner* — Peter A Salamon
(74) *Attorney, Agent, or Firm* — Brooks Kushman P.C.

(57) ABSTRACT

An omniphobic aqueous stain repellant integral grout additive contains an aminoalkyl-substituted polyorganosiloxane, preferably, a higher alkyl alkoxysilane, an organopolysiloxane T resin bearing silicon-bonded alkoxy groups, a fluoro(meth)acrylate polymer or copolymer, and preferably, a film forming (meth)acrylate polymer or copolymer latex. The omniphobic grout additive provides high stain repellancy to grout in an economic manner.

20 Claims, No Drawings

OMNIPHOBIC GROUT ADDITIVE

BACKGROUND OF THE INVENTION

1. Field of the Invention

The present invention pertains to an integral omniphobic grout additive which can be added to grout prior to grout application, and which renders grout resistant to staining.

2. Description of the Related Art

Mineral-based cementitious grouts have been used for millennia. Grouts are widely used to fill the spaces between ceramic tiles and other surfacing materials in bathrooms, kitchens, and other areas, for example on diverse substrates as automobile repair floors and on dining tables with tile or stone surfaces. These grouts contain a mineral binder such as a hydraulically setting mineral material. Cementitious, lime-based, and gypsum-based grouts are all well known. In addition to the mineral binder, grouts commonly contain fillers such as sand, ground limestone, etc., as well as pigments, processing additives, and the like. Grouts are available in dry, "redi-mix" form from numerous manufacturers and suppliers.

A common problem with such grouts is their general inability to resist staining. When the grout is contacted by a staining material, the color and/or surface texture may be locally altered, presenting an unaesthetic appearance. Common stains include oils, greases, food products, and the like. Noteworthy is that some of these staining materials are hydrophilic, while others are hydrophobic. Some, like tomato ketchup, are highly colored, while others, such as vegetable oils, are practically colorless. For example, oil-stained grout may show little color change per se, but may appear darker than surrounding unstained areas. Staining materials may also be in the form of emulsions or dispersions such as mustard or ketchup, solutions (e.g. black coffee), combinations of these, or may be neat (e.g. oils, brake fluid, etc.). The staining constituents themselves may be organic, inorganic, or both. When the staining material is organic, the possibility of accelerated microbial growth, which may cause additional staining, is possible.

It would be desirable to provide a means of preventing staining of grout. In the past, two approaches to imparting stain resistance have been used.

In a first method, grout is applied conventionally, generally with the aid of a "float," is then "tooled", and finally excess grout adhering to tile surfaces is removed using a wet or damp cloth or sponge, generally after partial cure. Following cure (setting) of the grout, an external or "topical" stain repellant formulation is applied. The stain repellant may be a solution or dispersion of silicones, silanes, and/or fluorochemicals, for example. This approach to stain repellency has the disadvantage that additional, labor-intensive application is necessary, and the further disadvantage that penetration of the stain repellant into the grout is minimal; only the surface and near-subsurface areas are affected. Moreover, the stain repellant may be removed over the course of time, then requiring a further application of stain repellant. Homeowners, in particular, generally do not apply further stain repellant, even though needed.

The number of patents directed to topically applied water and/or oil repellants is evidence of the importance of preventing water ingress and/or staining. Representative examples include U.S. Pat. No. 5,399,191, which discloses topical oil and water repellant compositions in the form of an aqueous dispersion of a salt of an amino-functional silicone together with an alkylalkoxysilane. The compositions have little stain repellency, and suffer from the drawbacks of other topical compositions. U.S. Pat. No. 5,527,931 discloses an aqueous dispersion for topical application to also provide water and oil repellency. The active ingredient is a monosilane or siloxane bearing three different groups: a hydrophilic group, a hydrophobic group, and an oleophobic group. These compounds are expensive to prepare.

WO 2007/127267 A2 discloses external stain, water, and oil repellant compositions. The active ingredients include a fluoropolymer and one or more organosilicon compounds, which may be alkoxysilanes or polydiorganosiloxanes. The composition is solvent-borne. Volatile organic solvents are highly disfavored due to environmental (greenhouse gas) concerns. French patent publication FR 2639353 A discloses external aqueous masonry protectants containing a major proportion of a polymer latex, a fluoropolymer latex, an organosilicon compound or polyolefin wax dispersion, a water soluble stabilizer such as a glycol, and a water insoluble coalescing agent such as a glycol diether. U.S. Pat. No. 6,410,626 discloses aqueous dispersion for external application to building materials for imparting waterproofing properties. The compositions contain a repellant which may be a fluoropolymer surfactant, fluorine-substituted oil, or fluoroalkyl-substituted organopolysiloxane; a linear organopolysiloxane terminated with alkoxy groups and bearing pendent alkoxy groups on each siloxy silicon atom, or a trialkoxysilane; and a fluoro-substituted polyolefin resin such as PTFE.

U.S. Pat. No. 8,455,585 discloses an external aqueous waterproofing composition containing a polybutene polymer, a polyorganosiloxane, and surfactant, for use in application to wood and masonry.

The second method for providing stain repellency is to admix a stain repellent with the grout prior to application to the tile or other surface. Such stain repellant additives are "integral" stain repellants. However, although such stain repellant additives are available, their stain-resisting performance is low. In addition, some additives may alter the setting properties of the grout, including "work time" or "open time," or may reduce physical properties of the cured grout to unacceptably low levels. For example, the grout may no longer be able to meet minimum ANSI standards. Also, some additives interfere with the ability to remove excess grout from stone or tile surfaces. Finally, the stain repellant additive must be economical.

Alkyl orthosilicates such as tetraethylsilicate and alkali metal organosiliconates have long been added to mineral construction materials such as plasters, renders, and cements to increase water repellency. However, these additives do little to protect against staining, and even their water repellant properties leave much to be desired.

U.S. Pat. No. 7,875,674 discloses the addition of a hydrophobic silicone resin into a curable inorganic matrix such as cement, followed by autoclaving at a temperature higher than the melting temperature of the silicone resin. No indication of any stain resistance is disclosed. The compositions are for reducing water ingress to prevent freeze/thaw damage. Grout cannot be autoclaved at high temperature. In the past, curable epoxy resins have also been added during mixing of grout, sometimes with further stain repellant ingredients. However, the grout then has only a small working time (short "pot life"), and stain repellency is still relatively low.

It would be desirable to provide an integral grout additive which can be easily admixed with other grout components during grout preparation; which is effective to minimize staining by divergent types of stains, including both hydrophilic (aqueous) and oleophilic (oily) stains ("omniphobic");

which maintains grout workability and physical properties, and which does not interfere with conventional grout application and cleanup.

SUMMARY OF INVENTION

It has now been surprisingly and unexpectedly discovered that a composition containing A) an aminoalkyl-functional polyorganosiloxane; B) optionally, a higher alkyl alkoxysilane; C) a T-functional organoalkoxypolyorganosiloxane; D) a fluorocarbon compound; and E) optionally, an acrylic latex polymer, in the fotin of an aqueous dispersion, provides an omniphobic grout additive which meets all the requirements of stain repellency for both hydrophilic and oleophilic stains, provides excellent workability and cleanup, and maintains grout physical properties.

DETAILED DESCRIPTION OF THE PREFERRED EMBODIMENTS

In measuring stain repellency of grout additives, it is necessary to prepare grout samples with and without the additive, cure the grout, apply a relevant stain, and clean to determine how much staining remains. Due to the great varieties of color of various stains and the surface texture of grout, no acceptable and reliable spectroscopic method for assessing staining is available, and this is particularly true of measurement of staining in grout lines. Thus, tests have been primarily subjective.

However, it has been determined that such assessments are prone to large error when conducted by common methods. There are no ISO or ANSI standards for cementitious or hydraulic grouts, although there is a test method published by the Ceramic Tile Institute of America (Field Report T-72 (R02)), which may be found at www.Ctioa.org. In these methods, test plaques of grout are prepared, and stain is applied. After defined periods, the plaques are cleaned by first removing excess staining material with absorbent paper towel, followed by a tap water scrub (10 scrubs) using a nylon scrub pad. The plaque is dried and the remaining stain is rated by an alphabetical scale. This method has proven to be largely unsatisfactory. In particular, when stain repellant additives are added to the grout prior to application, it has been found that there is a significant difference in staining depending upon whether the grout has been "tooled" or not. Since tooling is virtually always performed, the assessment of staining on an ordinary plaque will not truly represent stain repellant behavior.

In the application of grout to tiled surfaces, the grout is pressed between adjacent tiles using a "float," and "tooled" with a damp sponge. The "tooling" process ensures that a uniform grout line is produced. When using cast plaques to assess staining, no equivalent to tooling is generally used. It has been found that the stain repellency of a tooled joint line differs significantly from the staining assessed by standard cast plaques. There is a significant difference in the forces exerted during forcing of the grout into the "grout line" and during subsequent tooling, for example as between a ⅜ inch (9.5 mm) grout line and a 5 inch (12.5 cm) wide cast plaque. A detailed result of these findings are reported in Mania, D. J., "Stain Repellancy Testing of Cementitious Grouts," DRYMIX MORTAR YEARBOOK, 2014, pp. 54-65. The test methods described there are used herein.

Dry mix mortars for cementitious grouts are widely available from producers, commercial distributors, and retail stores. All of these dry grout mixtures contain a hydraulically setting mineral binder such as Portland cement, although numerous other binders are used commercially as well. These grouts also contain generally high amounts of fillers, such as ground limestone or dolomite, silica sand, etc., and further additives. Among the further additives, depending upon the end use, are setting accelerants, setting retarders, flow improvers, viscosifiers, anti-slump additives, flexibilizers, adhesive improvers, antimicrobials, and the like. Formulations for the basic grout mixtures are well known.

The omniphobic stain repellant additive is in the form of an aqueous dispersion. The aqueous dispersion preferably has a solids content ("active ingredient content," exclusive of water), of from preferably 5% by weight to 40% by weight. Lesser concentrations and greater concentrations may also be useful. On the low end, which is not limited, transportation costs per unit of active ingredients increases. At low concentrations, one is essentially transporting water. Thus, 5 weight percent is a reasonable lower limit, with concentrations of $\geq 10\%$, $\geq 15\%$, $\geq 20\%$, $\geq 25\%$, and $\geq 30\%$ being increasingly preferable.

At the high end, the upper concentration is essentially limited by dispersion stability. A high solids content may require increased amounts of surfactants to maintain stability in the aqueous dispersion. The silane, organosilicon, and fluoropolymers, in particular, are hydrophobic. However, surfactants, all of which are hydrophilic to some degree, may alter the curing time of the grout, and may also render the grout somewhat more hydrophilic, decreasing stain repellency for aqueous or hydrophilic stains. Thus, the upper limit of solids is dependent upon dispersion stability, and should be such so as to produce a stable emulsion. Stability in this sense means that visual separation (creation of multiple phases, creaming) does not occur, or if some separation or creaming is observed, redispersing can be effected by simple shaking or stirring, without the need for high shear mixing. Storage stability may be assessed following one week of storage at 40° C., for example, with the guidelines above in mind. Thus, the maximum solids concentration, in order of increasing preference, is $\leq 60\%$, $\leq 50\%$, $\leq 40\%$, and $\leq 35\%$. Solids are preferably contained in amounts of from 5-40%, more preferably 15-35%, based on the weights of the active (neat) ingredients, exclusive of surfactants, relative to total composition weight, and most preferably from about 15% to 25%. It should be noted that the term "solids" is used generally to refer to non-volatile active components, regardless of whether the component itself is actually a solid or liquid. Volatile ingredients such as water, alcohols, water-miscible solvents, etc., are not solids as that term is used herein. All ingredients (A)-(E) are "solids" as that term is defined.

The amount of the omniphobic stain repellant additive used in the grout mixture is an effective stain repellant amount, preferably at least 0.5% by weight, calculated as additive solids, relative to the dry weight of the grout components, more preferably at least 0.75% by weight. Higher amounts, such as 1.0 wt. % to 1.5 wt. % may also be used, depending upon the particular grout mix used, the degree of stain repellency desired, the types of staining materials to be encountered, and their frequency of encounter. The amount is not necessarily limited on the high end, except by cost considerations, and in the cases of large amounts, by a loss of grout properties either during processing (e.g. mixing, grout application), or following cure. At the high end, it is preferable to employ less than 4 wt. % based on additive solids, more preferably less than 3 wt. %, and most preferably less than 2.5 wt. %.

The additive ingredients are in the form of an aqueous emulsion, and the amount of mix water added to the grout is preferably decreased based on the water content of the omniphobic stain repellant aqueous dispersion. Based on a solids content of about 20%, the omniphobic grout additive dispersion is preferably used in amounts of 2.5 wt. % to 10 wt. %, more preferably 3 wt. % to 7.5 wt. %, and most preferably 3.75 wt. % to 5.0 wt. %, all relative to 100 parts of dry grout mix. Corresponding amounts of additives with lesser or greater solids contents can easily be calculated.

The omniphobic stain repellant additive aqueous dispersions require a surfactant to maintain dispersion stability. The amount of surfactant may range from 1 wt. % to 100 wt. % based on 100 parts of active solids, preferably 2 wt. % to 50 wt. %, more preferably 4 wt. % to 40 wt. %, and most preferably 6 wt. % to 30 wt. %. The amount of surfactant may be lower or higher than these ranges, but in any event, should be present in an amount sufficient to stabilize the emulsion as previously discussed; in other words, a "stabilizing amount" of surfactant is necessary. The surfactant may be supplied in a composition containing one or more of the active ingredients, e.g. a "subassembly."

The nature of the surfactant is not critical, and anionic, cationic, zwitterionic, and non-ionic surfactants may be used. Non-ionic surfactants are preferred. The surfactant, all or in part, may also be a protective colloid, e.g. polyvinyl alcohol, polyvinylpyrrolidone, starch, casein, etc.

Suitable surfactants include:

1. Alkyl sulfates, particularly those having a chain length of 8 to 18 C atoms, alkyl and alkyl ether sulfates having 8 to 18 C atoms in the hydrophobic radical and 1 to 40 ethylene oxide (EO) and/or propylene oxide (PO) units.

2. Sulfonates, particularly alkylsulfonates having 8 to 18 C atoms, alkylarylsulfonates having 8 to 18 C atoms, taurides, esters and monoesters of sulfosuccinic acid with monohydric alcohols or alkylphenols having 4 to 15 C atoms; these alcohols or alkylphenols may optionally also be ethoxylated with 1 to 40 EO units.

3. Alkali metal salts and ammonium salts of Carboxylic acids having 8 to 20 C atoms in the alkyl, aryl, alkaryl, or aralkyl radical.

4. Partial esters of phosphoric acid and their alkali metal and ammonium salts, particularly alkyl phosphates and alkaryl phosphates having 8 to 20 C atoms in the organic radical, alkyl ether phosphates and alkaryl ether phosphates having 8 to 20 C atoms in the alkyl or alkaryl radical, respectively, and having 1 to 40 EO units.

Suitable nonionic emulsifiers include, in particular:

5. Polyvinyl alcohol, which also has 5 to 50%, preferably 8 to 20%, of vinyl acetate units, with a degree of polymerization of 500 to 3000.

6. Alkyl polyglycol ethers, preferably those having 8 to 40 EO units and having alkyl radicals of 8 to 20 C atoms.

7. Alkylaryl polyglycol ethers, preferably those having 8 to 40 EO units and having 8 to 20 C atoms in the alkyl and aryl radicals.

8. Ethylene oxide/propylene oxide (EO/PO) block copolymers, preferably those having 8 to 40 EO and/or PO units.

9. Adducts of alkylamines having alkyl radicals of 8 to 22 C atoms with ethylene oxide or propylene oxide.

10. Fatty acids having 6 to 24 C atoms.

11. Alkylpolyglycosides of the general formula R*—O—$Z_u$, in which R* is a linear or branched, saturated or unsaturated alkyl radical having on average 8-24 C atoms and $Z_u$ is an oligoglycoside radical having on average u=1-10 hexose or pentose units or mixtures thereof.

12. Natural substances and their derivatives, such as lecithin, lanolin, saponins, cellulose; cellulose alkyl ethers and carboxyalkylcelluloses, whose alkyl groups in each case possess up to 4 carbon atoms.

13. Linear organo(poly)siloxane containing polar groups, especially those having alkoxy groups with up to 24 C atoms and/or up to 40 EO and/or PO groups.

Suitable cationic emulsifiers include, in particular:

14. Salts of primary, secondary, and tertiary fatty amines having 8 to 24 C atoms with acetic acid, sulfuric acid, hydrochloric acid, and phosphoric acids.

15. Quaternary alkyl- and alkylbenzeneammonium salts, more particularly those whose alkyl group possesses 6 to 24 C atoms, more particularly the halides, sulfates, phosphates, and acetates.

16. Alkylpyridinium, alkylimidazolinium, and alkyloxazolinium salts, more particularly those whose alkyl chain possesses up to 18 C atoms, especially the halides, sulfates, phosphates, and acetates.

Suitable ampholytic emulsifiers include, in particular:

17. Amino acids with long-chain substitution, such as N-alkyl-di(aminoethyl)glycine or N-alkyl-2-aminopropionic salts.

18. Betaines, such as N-(3-acylamidopropyl)-N,N-dimethylammonium salts with a $C_8$-$C_{18}$ acyl radical, and alkylimidazolium betaines.

Preferred as emulsifiers are nonionic emulsifiers, more particularly the alkyl polyglycol ethers listed above under 6., the adducts of alkylamines with ethylene oxide or propylene oxide, listed under 9., the alkylpolyglycosides listed under 11., and the polyvinyl alcohol listed under 5.

Particularly preferred polyvinyl alcohols also contain 5 to 20%, more particularly 10 to 15%, of vinyl acetate units, and preferably have a degree of polymerization of 500 to 3000, more preferably of 1200 to 2000.

The active ingredients which form the dispersed phase(s) of the omniphobic stain repellent additive dispersions are A) an aminoalkyl-functional organopolysiloxane; B) a higher alkylalkoxysilane; C) a T-functional organoalkoxypolyorganosiloxane; D) a fluorocarbon compound; and E) a film-forming acrylic latex polymer.

The aminoalkyl-functional organopolysiloxanes are organopolysiloxanes having at least one aminoalkyl group, and preferably, at least one silanol or silicon-bonded alkoxy group. The aminoalkyl-functional organopolysiloxanes are preferably aminoalkyl-functional polydimethylsiloxanes.

The aminoalkyl-functional organopolysiloxanes are more preferably linear or branched, non-resinous liquid polydiorganosiloxanes bearing aminoalkyl groups, either pendent, terminal, or both pendent and terminal. The aminoalkyl-functional organopolysiloxanes also preferably contain silicon-bonded OH groups or silicon-bonded alkoxy groups. Aminoalkyl-functional organopolysiloxanes preferably are those of the Formula I:

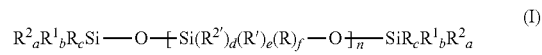

(I)

where R is an optionally chloro- or fluoro-substituted $C_{1-18}$ hydrocarbon moiety, preferably $C_{1-18}$ alkyl, $C_{6-10}$ aryl, or $C_{6-18}$ alkaryl, preferably an unsubstituted hydrocarbon moiety, more preferably methyl, or a residue

$R^1$ is

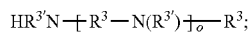

$R^2$ is —OH or —OR;
$R^{2'}$ is —OH, —OR, or (poly)siloxy optionally substituted by $R^2$ and/or $R^1$;
$R^3$ is $C_{1-6}$ alkylene, preferably $C_{2-3}$ alkylene;
$R^{3'}$ is hydrogen or R;
A is $C_{2-4}$ alkylene;
X is H or $R^4$, where $R^4$ is $C_{1-18}$ alkyl;
a and c are 0, 1, 2, or 3;
b is 0 or 1;
d is 0, 1, or 2;
e is 0 or 1;
f is 0, 1, or 2,
m is 0-100, preferably 2-50;
n is 1-1000, preferably 2-500, and more preferably 10-100;
o is 0-10, preferably 0-4, and more preferably 0 to 2, especially 0 or 1;
with the provisos that the sum of a+b+c is 3, the sum of d+e+f is 2, and at least one $R^1$ is present.

In formula (I), all of the various groups may be independently selected from their respective constituent groups.

The formula (I) may have T groups, which provide branching sites for pendent organopolysiloxane chains. In the compounds of the Formula I, at least one $R^1$ which is aminoalkyl is present, and the compounds preferably contain 2-10 aminoalkyl groups, more preferably 2-5 aminoalkyl groups. Examples of preferred aminoalkyl groups are aminopropyl and N-(2-aminoethyl)-3-aminopropyl groups. The aminoalkyl-functional organopolysiloxane is preferably not included in the form of a salt.

Preferred aminoalkyl-functional organopolysiloxanes are branched organopolysiloxanes of the formula:

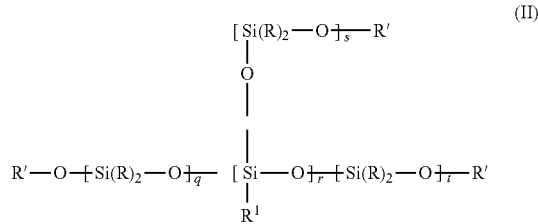

where $R^1$ is as defined previously, and R' is $C_{1-4}$ lower alkyl, or H,
r is from 1 to 10, preferably 1-5;
q, t, and s are each, independently from 1-500, preferably 1-100 and more preferably 1-50, and
the sum of q, t, and s is at least 20. The branched aminoalkyl-functional organopolysiloxanes of the formula (II) preferably have amine numbers in the range of 0.01 to 0.3 meq/g, more preferably 0.05 to 0.25 meq/g and most preferably 0.10 to 0.20 meq/g, and preferably viscosities at 25° C. of 10-2000 mm²/s, more preferably 50-1200 mm²/s, and most preferably 80-700 mm²/s.

In this aminoalkyl-functional branched organopolysiloxane, R' is preferably H or methyl. The aminoalkyl-functional organopolysiloxanes are commercial products or can be prepared by standard methods of organosilicon chemistry. The aminoalkyl-functional organopolysiloxane is preferably supplied as an aqueous emulsion or dispersion, stabilized with a surfactant or protective colloid. Polyvinyl alcohol is such a protective colloid.

Based on an omniphobic stain repellant aqueous dispersion additive having a total of 20% solids based on 100 parts of the weights of ingredients A)-E), the amino-functional polyorganosiloxanes A) is present in an amount of from 1 part to 30 parts by weight, preferably 2 parts to 20 parts, and most preferably 2 parts to 15 parts by weight. More than one type of amino-functional polyorganosiloxane A) may be used.

The optional higher alkyl alkoxysilane B) has the formula:

where
$R^5$ each independently is a higher, $\geq C_3$ hydrocarbon, preferably a $C_{3-24}$ alkyl or $C_7$-$C_{12}$ arylalkyl group, preferably a $C_{4-18}$ alkyl group, and most preferably a $C_{8-18}$ alkyl group;
$R^6$ each independently is $C_{1-4}$ alkyl, preferably methyl or ethyl; and
g is 1, 2, or 3, preferably 1 or 2, and most preferably 1.

Examples of $R^5$ groups are propyl, butyl such as n-butyl, pentyl such as n-pentyl, hexyl such as n-hexyl, heptyl such as n-heptyl, octyl such as n-octyl and isooctyl, decyl, dodecyl, tridecyl, tetradecyl, octadecyl, and eicosyl. These examples are non-limiting. Further examples are benzyl, phenylethyl, naphthylethyl, and other arylalkyl substituents. Alkyl substituents are preferred. Most preferred are $C_{6-18}$ alkyl groups, especially isooctyl groups.

In the higher alkyl alkoxysilane, the alkoxy groups are preferably groups which are readily hydrolysable. Methoxy and ethoxy groups are thus preferred. It is most preferred that g is 1. In other words, the preferred silanes are trialkoxysilanes. In lieu of the alkoxysilanes themselves, the composition may contain partial hydrolysates of these, but this is not preferred. Some hydrolysis may unavoidably take place during storage, however, and the compositional requirements of the additive are satisfied when the claimed amount of higher alkyl alkoxysilane or partial hydrolysate thereof is initially added to the composition. The higher alkyl alkoxysilanes are commercial products or may be prepared by methods conventional in organosilicon chemistry.

The amount of optional component (B), on the same basis used for component (A), is in the range of 0 to 50 parts by weight, preferably 15 parts to 50 parts by weight, yet more preferably 20 parts to 40 parts by weight, and most preferably 20 to 35 parts by weight. More than one type of higher alkyl alkoxysilane may be used. Also, lower alkyl alkoxysilanes may also be present, such as vinyltrimethoxysilane, vinyltriethoxysilane, methyltrimethoxysilane, and methyltriethoxysilane. These lower alkyl alkoxysilanes are not considered as a component (B), however, and are not considered when calculating component concentrations, which are based only on components (A) through (E). Component B) is preferably present in the composition.

The T-functional polyorganosiloxane resin C) is a "T-resin" which is preferably composed of 100% T units $R^7SiO_{3/2}$ where $R^7$ is $C_{1-18}$ alkyl, more preferably $C_{1-8}$ alkyl, more preferably $C_{1-4}$ alkyl, preferably methyl; or phenyl, and also containing silicon-bonded alkoxy groups. It would not depart from the spirit of the invention to include a most minor proportion, e.g. less than 10 mol percent, preferably less than 5 mol percent of M ($R_3^7SiO_{1/2}$), D ($R_2^7SiO_{2/2}$) or Q ($SiO_{4/2}$) units, but these are not preferred. The alkoxy groups are preferably methoxy or ethoxy groups, preferably ethoxy groups. Preferred T-functional polyorganosiloxanes have viscosities of 5-50 mm/s, more preferably 10-30 mm/s. Preferred T-functional organopolysiloxanes have a weight average molecular weight Mw of 1500-4000 g/mol, polydispersities greater than 1 and preferably 1.5-3.5, and contain from 10 to 45 weight percent of silicon-bonded alkoxy groups. A particularly preferred component (C) is a methyl silicone T-resin with a weight average molecular weight $M_w$ of about 2650 g/mol, a polydispersity of about 2.8, and a viscosity of 22 mm/s, containing 36 weight percent of silicon-bonded ethoxy groups randomly distributed. Such resins are commercially available or can be prepared by methods customary in organosilicon chemistry.

The T-functional polyorganosiloxane is present, on the same basis used for component (A), in amounts of 2 parts to 30 parts by weight, more preferably 3 to 20 parts by weight, and most preferably 4 to 20 parts by weight. More than one type of component (C) may be used.

The fluorocarbon compound is preferably soluble, emulsifyable, or dispersible in water, and preferably contain a $C_3$ or higher, preferably $C_3$-$C_6$ perfluorinated group. Perfluorocarbon phosphates and their salts are suitable, for example. The fluorocarbon compound is preferably polymeric, and is preferably a polymerization product of a fluoroalkyl(meth) acrylate with other acrylate monomers. The fluoroalkyl (meth)acrylate monomers preferably are (meth)acrylate esters of a $C_3$ or higher alkanol, where at least 20 mol percent of alkyl group hydrogen atoms have been replaced by fluorine, more preferably at least 50 mol percent, and most preferably 80 mol percent or more, including perfluorinated alkyl groups. Non-limiting examples of such monomers include 2,2,3,3,4,4,5,5,6,6,7,7-dodecafluoroheptyl acrylate; 3,3,4,4,5,5,6,6,7,7,8,8,9,9,10,10,11,11,12,12-12-heneicosafluorodeodecyl acrylate; 3,3,4,4,5,5,6,6,7,7,8,8,9,9,10,10,10-heptadecafluorodecyl methacrylate; 2,2,3,3,4,4,4-heptafluorobutyl acrylate; 2,2,3,3,4,4,4-heptafluorobutyl methacrylate; 2,2,3,4,4,4-hexafluorobutyl acrylate; 2,2,3,4,4,4-hexafluorobutyl methacrylate; 1,1,1,3,3,3-hexafluoroisopropyl acrylate; 1,1,1,3,3,3-hexafluoroisopropyl methacrylate; 2,2,3,3,4,4,5,5-octafluoropentyl acrylate; 2,2,3,3,4,4,5,5-octafluoropentyl methacrylate; 2,2,3,3,3-pentafluoropropyl acrylate; 2,2,3,3,3-pentafluoropropyl methacrylate, 1H,1H,2H,2H-perfluorodecyl acrylate; 2,2,3,3-tetrafluoropropyl methacrylate; 3,3,4,4,5,5,6,6,7,7,8,8-tridecafluorooctyl acrylate; 3,3,4,4,5,5,6,6,7,7,8,8-tridecafluorooctyl acrylate, 3,3,4,4,5,5,6,6,7,7,8,8,-tridecafluorooctyl methacrylate; 2,2,2-trifluoroethyl methacrylate; 1,1,1-trifluoro-2-(trifluoromethyl)-2-hydroxy-4-methyl-5-pentyl methacrylate. A most preferred fluoroalkyl(meth)acrylate is 3,3,4,4,5,5,6,6,7,7,8,8-tridecafluorooctyl acrylate.

The fluoroalkyl(meth)acrylate monomers may be copolymerized with other copolymerizable monomers, including, but not limited to, ethylene, propylene, other mono- and di-olefins, alkyl(meth)acrylates, preferably $C_{1-18}$ alkyl (meth)acrylates, more preferably $C_{1-4}$ alkyl(meth)acrylates, (meth)acrylic acid, acrylonitrile and aminoalkyl(meth)acrylates where the amino group may be a primary, secondary, or tertiary amino group. Preferred comonomers are alkyl (meth)acrylates, acrylonitrile, and aminoalkyl(meth)acrylates, preferably dialkylaminoalkyl methacrylates such as N,N-dimethylaminoethylmethacrylate (DMAEMA). Such fluorpolymers are available commercially from numerous commercial sources or can be synthesized by methods well known in polymer chemistry. A preferred fluoropolymer is a copolymer of tridecafluoroctyl acrylate and dialkylaminoethylmethacrylate as a 20 weight percent fluoropolymer in an aqueous composition. Other suitable but less preferred fluoropolymers are the aqueous fluoropolymers and fluorocarbon compounds and compositions available from 3M Company as e.g. Capstone™ ST-300, FS 81, and FS 63, PM 490, L-21301 and L-22225 the water soluble anionic fluoropolymers of the Capstone™ series from DuPont, preferably Capstone™ FS 63, Hexafor™ 6240 from Maflon, Nuva™ 2155 and 2114 from Clariant, and Chemgard™ F764 from Chemgard. The fluorocarbon compounds and fluoropolymers may be water soluble, partially water soluble or water dispersible, for example by themselves or with the aid of a surfactant. By suitable choice of anionic or cationic copolymers, or by forming a salt of anionic or cationic groups included in the fluoropolymer, the solubility and/or dispersibility can be altered.

Identifying a suitable fluorocarbon compound and/or fluoropolymer for use in a particular formulation is straightforward. The formulation, including the fluoropolymer, is tested in a grout mixture for stain repellency, and a similar test is made after storage of the additive dispersion, for example after 30 days at 40° C. The stain repellency after storage should remain adequate, preferably decreasing by no more than 30%, more preferably no more than 20%, yet more preferably no more than 10%, and most preferably no more than 5% after this time, indicating compatibility (lack of detrimental reactivity) with the other additive components. Preferably, substantially no loss in stain repellency should be observed.

The fluorocarbon compound, preferably a fluoropolymer, on the same basis as for component (A), is present in amounts of from 20 parts to 70 parts by weight, more preferably 25 parts to 60 parts by weight, yet more preferably 25 to 50 parts by weight, and most preferably 30 to 40 parts by weight. More than one type of fluorocarbon compound or fluoropolymer may be used.

The optional acrylic latex polymer (E) is preferably in the form of a surfactant or protective colloid-stabilized dispersion, and is an acrylate film-forming polymer. The monomers of the acrylate polymer comprise one or more (meth) acrylate esters, such as methyl(meth)acrylate, ethyl(meth) acrylate, butyl(meth)acrylate, 2-hydroxyethyl(meth) acrylate, and the like. These monomers are preferably not fluorinated, but a minor incorporation of fluoro-substituted monomers, for example less than 10 mol %, preferably less than 5 mol %, and more preferably less than 2 mol %, is also within the scope of the invention, provided that the polymer is a film-forming polymer. The polymers are quite different from the fluoropolymers, which contain a high percentage of highly fluorinated alkyl groups. Fluoroalkyl groups are preferably absent in the acrylate polymer. The film formation temperature is preferably less than 30° C., more preferably less than 25° C., yet more preferably less than 20° C., and most preferably in the range of −10° C. to 15° C.

The optional acrylate polymer E) may be based on one or more (meth)acrylate monomers, and preferably also contains at least one non-acrylate comonomer. Suitable non-acrylate comonomers include olefins such as ethene, propene, n-butene, butadiene, acrylonitrile, styrene, and α-methylstyrene, and further may contain functional monomers to aid in adhesive properties, for example acrylic acid, methacrylic acid, crotonic acid, and the like.

The acrylate polymers may be supplied as a redispersible powder, but are preferably supplied as an aqueous dispersion, with the aqueous phase of the dispersion providing a portion of the total amount of water contained in the additive dispersion. Examples of acrylate polymers include Virmapas® CP-67, a product of Wacker Chemie, Munich, Germany, and Rhoplex®EI-6000, Rhoplex® CS-380 and RhoplexR CS-4000, products of the Dow Chemical Company, Midland, Mich. Preferred acrylate polymers are copolymers of butyl acrylate with methylmethacrylate, and butyl acrylate with styrene. Preferred polymers may contain acrylic acid and methacrylic acid in minor proportions to aid adhesion. A preferred acrylate polymer is Rhoplex MC-76 available from Dow Chemical Co., Midland, Mich., as an approximately 47% solids milky white dispersion with a pH of 9-12, and a Tg of 8-13° C. The minimum film formation temperature is 10-12° C.

Since the acrylate polymers in the dispersions are solids, and in general have only a minimal amount of hydrophilic or ionic groups, dispersion stability is generally achieved through the use of surfactants, which may even be present in relatively large amounts. The surfactants are generally non-ionic surfactants, such as alkylphenol ethoxylates, particularly nonylphenol ethoxylates. Suitable surfactants have been previously described.

The amount of acrylic polymer optionally present, on the same basis as used for component (A), is relatively low, from 0 parts by weight to 20 parts by weight, preferably 2 parts by weight to about 20 parts by weight, more preferably from 4 parts by weight to about 20 parts by weight, and most preferably 5 parts by weight to about 20 parts by weight, based on acrylate dispersion solids. More than one type of acrylic latex polymer may be used. Non-film forming acrylate polymers may also be present, but are not counted as component (D). Component E) is preferably present in the composition.

In the foregoing descriptions of the individual components, the amounts in parts by weight total 100 parts, based on the total of components (A) through (E). The components are considered to be present when they are initially admixed to form the composition or are formed in situ. The omniphobic stain repellant grout additive may also be supplied as a plurality, preferably no more than two, separate aqueous emulsions, which are mixed on site or separately added to the grout during mixing, although this is not preferred. Finally, the ingredients may be supplied in concentrated form, even in some cases neat, without water, and diluted with water at the job site in the case of concentrates, or emulsified on the job site in the case of use of one or more ingredients in neat form, although this is not preferred. Most preferably, the omniphobic grout additive is supplied in "ready to use" form.

The omniphobic stain repellant additive dispersion may comprise additional ingredients other than the required ingredients (A) through (E). These ingredients may comprise, for example, foam control agents, biocides, wetting agents, additional stain repellant agents, conventional cement additives, dyes, pigments, and the like. Suitable foam control agents include silicones and silicone-based surfactants, as well as conventional defoaming non-ionic surfactants. One preferred class of defoaming surfactants are the so-called "Gemini" surfactants which are alkyne diols or oxyalkylated alkyne diols, sold under the tradename SURFYNOL™ by Air Products.

Suitable biocides are well known, and conventional "in can" commercially available biocides such as those of the isothiazolinone type are advantageously used. A preferred biocide is Kathon™ LX, available from Dow Chemical Corporation in a 1.5% aqueous preparation.

Suitable wetting agents may be selected from surfactants which provide for a low surface tension, and are well known. Preferred wetting agents are polyoxyalkylated organosilicon compounds, in particular polyoxyethylated polyorganosiloxanes such as Wacker™ L 051 and the BYK-300 series of polyether silicone wetting agents available from BYK Chemie, Germany, and the polyether silicone wetting agents of Dow Corning Corporation, Toledo, Ohio. Wetting agents are generally used in relatively small amounts, e.g. 0.5 weight percent based on the total weight of the omniphobic stain repellant additive dispersion.

Other stain repellant additives include generally hydrophobic polymer dispersions, such as copolymers of vinyl acetate, ethylene, and higher alkyl esters such as VeoVa™ 11 and VeoVa™ 12 (available from Hexion); oligomeric polyolefin waxes; olefin polymer dispersions such as dispersions of polyethylene or polypropylene; silanol-terminated and trimethylsilyl-terminated polyorganosiloxanes, preferably polydimethylsiloxanes and polydimethylsiloxanes where some of the methyl groups are replaced by $C_{4-18}$ alkyl groups, $C_{6-10}$ aryl groups, or $C_{7-14}$ arylalkyl groups; MQ, MTQ, MDT, and MDTQ silicone resins, particularly methyl resins such as MQ resins; fluorochemicals other than fluoropolymers, e.g. essentially monomeric fluorocompounds; partial hydrolysates of tetramethylsilicate and tetraethylsilicate, and the like.

Cement additives are well known, and include cement modifiers such as casein, silicone polyoxyalkylene copolymers, melamine formaldehyde sulfonates, naphthalene formaldehyde sulfonates, neutralized, partially neutralized, or unneutralized, polyacrylic acids, including polycarboxylic acid/ethylene copolymers, and like additives. Suitable cement modifiers are well known and commercially available.

Suitable dyes and pigments are well known, and may be organic or inorganic, natural or synthetic.

Most preferably, the omniphobic water repellant additive dispersion contains only ingredients (A) through (E), a biocide, and a wetting agent. Preferred compositions also contain only these ingredients plus a foam control agent, optionally also containing at least one further stain repellant additive. Preferably, no ingredients other than these (water, of course generally being present) are used.

The omniphobic stain repellant additive dispersions are prepared easily by simple, uniform mixing of all required ingredients, in any order. The solids content based on the total of ingredients (A) through (E) is preferably from 10 weight percent to 40 weight percent, with a 20 weight percent dispersion being preferred.

The omniphobic stain repellant additive dispersion may be added to the mix water for the grout, or to grout already containing a portion of water; the mixing order and procedure is not critical. The total amount of water used, including that in the omniphobic water repellant additive, is preferably the amount recommended by the grout manufacturer. The invention also pertains to a grout comprising all of components (A) through (E).

Staining may be assessed by adding the omniphobic water repellant additive to grout and grouting glazed ceramic tiles spaced 0.25 inch (6.4 mm) apart, to provide a 0.25 inch (6.4 mm) grout line. After grouting using a standard float, the grout line is tooled with a damp sponge, and allowed to cure for 7 days. Staining materials are then applied to the grout lines, and allowed to stand for 2 hours. The stains are then removed by the procedures disclosed in the CT10A-T72 Field Report, and assessed on a 4 point scale. On this scale, 0 represents no visible stain, 0.5 represents no stain per se, but a halo or observable spot where the stain was placed, and 1, 2, 3 and 4 represent visible stain, with 4 representing no stain removal.

The staining materials used were 12 in all: Skydrol, Brake Fluid, Motor Oil, white wine vinegar, yellow mustard, vegetable oil, coffee, soy sauce, red wine, water, ketchup, and Coca-Cola™. For the 12 stains, a maximum score of 48 is possible (substantially no stain repellency). The lower the score, the higher the stain repellency.

Example 1

A dispersion of 8 parts of 50% by weight of an N-(2-aminoethyl)-3-aminopropyl-functional branched organopolysiloxane of formula (II), having an amine number of about 0.15 meq/g and a viscosity of about 400 mm$^2$/s, 39 parts by weight of isooctyltriethoxysilane, and 7 parts by weight of a methyl silicone T-resin containing 36 weight percent of silicon-bonded ethoxy groups, a molecular weight of about 2560 g/mol, a polydispersity of 2.8, and a viscosity of 22 mm$^2$/s is prepared, with the aid of 3 parts by weight of oxyalkylated isotridecyl alcohol as a surfactant, remainder water. This dispersion subassembly serves to supply components (A), (B), and (C) to the grout additive, and is referred to in the Examples as the organosilicon compound dispersion.

Example 2

An omniphobic stain repellant grout additive dispersion is prepared by mixing together (25° C.) 16.23 parts of the organosilicon compound dispersion of Example 1, 45.94 parts of a fluoropolymer dispersion (20% solids) the fluoropolymer being a copolymer of tridecafluorooctylacrylate and dialkylaminoethylmethacrylate, 5.00 parts of an acrylate polymer dispersion (50% solids) having a film forming temperature of about 11° C., 0.50 parts of polyether silicone wetting agent, and 0.2% Kathon LX 1.5% biocide, and 32.13 parts water until homogenous. The total solids content of the dispersion is 20.0 wt. %.

The formulation of Example 2 is tested for stain repellency and compared with ten commercially available stain repellant grout additives (A-J), used in accordance with the manufacturer's recommendation in four different commercially available grout mixtures. The results are presented in the Table below.

lency as compared to "staining" with water. In some cases, performance was actually worse. For additives A-J, the best performance was achieved in commercial grout 3, as can be seen from the averages in the 11$^{th}$ row of the table. The additive of Example 2, according to the invention, was much better in stain repellency, a "dramatic" improvement, for lack of a better superlative. The average of all the averages (row 11, far right side) for the commercial additives was 17.2, while that of the additive of Example 1 was only 1.3. In commercial grout 4, the stain repellency was perfect, with the performance in commercial grout 3 not far behind.

Comparative Examples C1 to C5

Comparative stain repellant additives were prepared using the following ingredients:

TABLE 2

|  | C1 | C2 | C3 | C4 | C5 |
|---|---|---|---|---|---|
| Subassembly of Ex. 1 | 40.00 | 20.00 | 20.00 | — | — |
| Fluoropolymer Dispersion of Ex. 2 | — | 50.00 | — | 100.00 | — |
| Acrylate Dispersion of Ex. 2 | — | — | 20.00 | — | 40.00 |
| Water | 120 | 60 | 120 | 20 | 120 |
| Total Stain Repellancy | 33 | 24 | 36 | 25 | 39 |
| Total Non-Industrial Stain | 21 | 17 | 24 | 18 | 27 |
| Dispersion Stability | Stable | Separated | Stable | Stable | Stable |

In the Comparative Examples, the amount of water was adjusted to provide the same solids content based on the active ingredients used. In addition, each formulation contained 0.2 wt. % Kathon LX biocide and 0.5 wt. % polyether silicone wetting agent. All formulations also contained TES 40, a partial hydrolysate of ethylsilicate, in an attempt to further increase performance. Formulation C2 showed stain repellancy similar to the stain repellancy of Example 2, but contained a greater amount of fluoropolymer, and separated upon storage. Formulation C4 also showed high stain repellency, but is too expensive, containing only fluoropolymer as an active ingredient. Examples C3 and C5, containing no fluoropolymer, and in the case of C5, no fluoropolymer and

TABLE 1

|  | Basic Chemistry | Commercial Grout 1 | | Commercial Grout 2 | | Commercial Grout 3 | | Commercial Grout 4 | | |
|---|---|---|---|---|---|---|---|---|---|---|
|  |  | 30 min | 2 Hour | 30 min | 2 Hour | 30 min | 2 Hour | 30 min | 2 hour | AVERAGES |
| Grout Admixture | Silicone/Fluoro-chemical | 21.5 | 23.0 | 22.0 | 23.0 | 9.0 | 20.0 | 22.0 | 26.0 |  |
| A | Fluoro-chemical | 14.0 | 15.5 | 13.5 | 16.5 | 1.5 | 9.5 | 10.0 | 20.5 |  |
| B | Silicone/Fluoro-chemical | 17.5 | 18.0 | 16.5 | 24.0 | 5.5 | 10.0 | 18.0 | 21.0 |  |
| C | Acrylic | 22.0 | 23.0 | 23.5 | 23.5 | 14.5 | 19.5 | 23.0 | 25.0 |  |
| D | Silicone | 16.0 | 18.0 | 20.0 | 22.5 | 6.5 | 15.0 | 11.5 | 17.5 |  |
| E | Fluoro-chemical | 20.5 | 21.0 | 26.0 | 26.0 | 13.0 | 19.0 | 16.0 | 17.0 |  |
| F | Fluoro-chemical | 11.5 | 16.0 | 10.0 | 14.5 | 44.5 | 19.0 | 10.0 | 14.5 |  |
| G | Silicone/Fluoro-chemical | 10.5 | 13.0 | 16.0 | 19.5 | 3.0 | 7.0 | 11.5 | 13.0 |  |
| H | Silicone/Fluoro-chemical | 11.0 | 12.0 | 8.5 | 15.5 | 4.0 | 13.5 | 1.5 | 7.5 |  |
| I | Acrylic | 26.5 | 27.0 | 26.5 | 30.0 | 20.5 | 25.0 | 26.0 | 27.0 |  |
| J |  | 17.1 | 18.7 | 18.3 | 21.5 | 12.2 | 15.8 | 15.0 | 18.9 | 17.2 |
| Averages |  |  |  |  |  |  |  |  |  |  |
| Water Only |  | 25.5 | 25.0 | 24.5 | 27.0 | 18.5 | 23.0 | 25.5 | 26.0 | 24.4 |
| Example 2 | Silicone/Fluoro-chemical/Acrylic | 0.5 | 2.0 | 2.5 | 4.0 | 0.0 | 1.5 | 0.0 | 0.0 | 1.3 |

As can be seen from Table 1, the various commercial additives showed only modest improvement in stain repelnone of the Example 1 subassembly, were both very poor in stain repellancy. The Example and Comparative Examples demonstrate that in order to create an economically acceptable additive with excellent stain repellancy, the ingredients and their amounts as set forth herein are necessary.

The same commercially available integral stain repellants and the inventive stain of Example 2 were tested in grout mixtures and the physical properties measured according to ANSI standards. It is desirable that an integral stain repellant does not overly change application parameters or physical properties, such that these meet current ANSI standards, if applicable.

TABLE 3

Set-time (Initial - Minutes)

| Admixture | Grout 1 | 2 | 3 | 4 |
|---|---|---|---|---|
| A | 180 | 135 | 160 | 150 |
| B | 180 | 130 | 155 | 120 |
| C | 200 | 210 | 205 | 235 |
| D | 180 | 175 | 180 | 160 |
| E | 200 | 140 | 170 | 150 |
| F | 95 | 70 | 85 | 120 |
| G | 210 | 135 | 175 | 140 |
| H | 190 | 175 | 185 | 130 |
| I | 235 | 105 | 120 | 170 |
| J | 110 | 90 | 100 | 125 |
| Example 2 | 210 | 175 | 180 | 165 |
| Water-only | 165 | 120 | 145 | 125 |
| Average (of Admixtures) | 172 | 140 | 156 | 151 |
| St. Dev. (of Admixtures) | 40 | 42 | 38 | 33 |

Most admixtures have the effect of lengthening the initial set time. The omniphobic water-repellant stain repellant of Example 2 only lengthens the time by an average of ~35 minutes versus water-only. However, this is within the standard deviation of all admixtures evaluated thus showing that all admixtures have a similar effect.

TABLE 4

Set-Time (Final - Minutes)

| Admixture | Grout - 1 | 2 | 3 | 4 |
|---|---|---|---|---|
| A | 265 | 230 | 250 | 295 |
| B | 300 | 215 | 260 | 300 |
| C | 295 | 290 | 295 | 330 |
| D | 260 | 240 | 250 | 275 |
| E | 295 | 265 | 280 | 290 |
| F | 170 | 135 | 155 | 230 |
| G | 285 | 260 | 275 | 310 |
| H | 285 | 255 | 270 | 275 |
| I | 185 | 290 | 240 | 295 |
| J | 180 | 140 | 160 | 180 |
| Example 2 | 275 | 240 | 260 | 225 |
| Water-only | 215 | 295 | 255 | 225 |
| Average (of Admixtures) | 254 | 233 | 245 | 279 |
| St. Dev. (of Admixtures) | 50 | 52 | 46 | 41 |

Most admixtures have the effect of lengthening the final set time. The omniphobic water-repellant stain repellant of Example 2 only lengthens the final set by an average of ~40 minutes versus water-only in two grouts, and speeds up the final set time versus water-only by an average of 40 minutes in two grouts. However, this is within the standard deviation of all admixtures evaluated thus showing that all admixtures have a similar effect. Additionally, all times are less than 6 hours which is accepted industry standard for final set-time of sanded cementitious grout as determined by Gilmore Needles.

TABLE 5

Compressive Strength (psi - 24 hours)

| Admixture | Grout 1 | 2 | 3 | 4 |
|---|---|---|---|---|
| ANSI Specification (A118.7) | >500 | | | |
| A | 1635 | 1244 | 2115 | 474 |
| B | 1759 | 1837 | 2273 | 523 |
| C | 1787 | 1733 | 1788 | 557 |
| D | 2342 | 1234 | 2143 | 314 |
| E | 1859 | 1087 | 1980 | 956 |
| F | 2417 | 1933 | 2273 | 986 |
| G | 2772 | 1926 | 2110 | 877 |
| H | 2516 | 1278 | 2228 | 785 |
| I | 2696 | 1913 | 2541 | 604 |
| J | 2758 | 1730 | 2908 | 644 |
| Example 2 | 1750 | 1356 | 2188 | 525 |
| Water-only | 4438 | 2023 | 2451 | 550 |
| Average (of Admixtures) | 2208 | 1569 | 2231 | 659 |
| St. Dev. (of Admixtures) | 453 | 329 | 292 | 215 |

Most admixtures have the effect of reducing the 24-hour compressive strength. The omniphobic water-repellant stain repellant of Example 2 only reduces this by an average of ~212 psi versus water-only, which is less than 10% in most cases and is in-line with most other admixtures. Additionally, the omniphobic water-repellant stain repellant of Example 2 still allows the grout to pass ANSI A118.7 specifications.

TABLE 6

Compressive Strength (psi - 28 days)

| Admixture | Grout 1 | 2 | 3 | 4 |
|---|---|---|---|---|
| ANSI Specification (AS118.7) | >3000 | | | |
| A | 4868 | 3743 | 3835 | 1776 |
| B | 4117 | 4759 | 3451 | 1980 |
| C | 4751 | 4776 | 3722 | 2487 |
| D | 6453 | 4019 | 3884 | 1945 |
| E | 4994 | 4019 | 3367 | 3140 |
| F | 5373 | 4652 | 3713 | 2278 |
| G | 6155 | 4595 | 3889 | 2299 |
| H | 6195 | 3589 | 4120 | 3034 |
| I | 6963 | 5096 | 4193 | 3127 |
| J | 6479 | 4629 | 5021 | 2668 |
| Example 2 | 6152 | 4121 | 3774 | 3232 |
| Water-only | 7500 | 4671 | 3881 | 3086 |
| Average (of Admixtures) | 5681 | 4363 | 3906 | 2542 |
| St. Dev. (of Admixtures) | 901 | 485 | 443 | 531 |

Some admixtures have the effect of reducing the 28-day compressive strength. The omniphobic water-repellant stain repellant of Example 2 only reduces this in 3 of 4 grouts by an average of ~680 psi versus water-only, which is less than 10% in most cases and is in-line with most other admixtures. Additionally, The omniphobic water-repellant stain repellant of Example 1 still allows the grout to pass ANSI A118.7 specifications.

TABLE 7

Flexural Strength (psi - 28 days)

| Admixture | Grout | | | |
|---|---|---|---|---|
| | 1 | 2 | 3 | 4 |
| ANSI Specification (A118.6/A118.7) | >500/1000 | | | |
| A | 865 | 923 | 703 | 519 |
| B | 423 | 760 | 707 | 427 |
| C | 748 | 1021 | 846 | 499 |
| D | 949 | 1021 | 802 | 406 |
| E | 512 | 664 | 622 | 527 |
| F | 631 | 823 | 719 | 468 |
| G | 395 | 701 | 609 | 505 |
| H | 1042 | 707 | 772 | 723 |
| I | 1011 | 951 | 800 | 681 |
| J | 808 | 571 | 877 | 503 |
| Example 2 | 1122 | 500 | 568 | 460 |
| Water-only | 1061 | 766 | 776 | 453 |
| Average (of Admixtures) | 773 | 785 | 730 | 521 |
| St. Dev. (of Admixtures) | 254 | 177 | 100 | 100 |

Only a few examples will pass the High Performance standard of 1000 psi, this includes the controls with using water-only. Most of the admixtures either increase or have no effect upon the flexural strength of the final grout. The omniphobic water-repellant stain repellant of Example 2 passes the High Performance Standard with one grout and the Standard Performance standard with two other grouts. The one grout it does not pass either standard, the control does not either.

TABLE 8

Shrinkage (% change 28 days)

| Admixture | Grout | | | |
|---|---|---|---|---|
| | 1 | 2 | 3 | 4 |
| ANSI Specification (A118.6/A118.7) | <0.20/0.20 | | | |
| A | 0.06 | 0.14 | 0.08 | 0.12 |
| B | 0.16 | 0.16 | 0.05 | 0.12 |
| C | 0.08 | 0.08 | 0.06 | 0.11 |
| D | 0.09 | 0.13 | 0.02 | 0.43 |
| E | 1.66 | 1.03 | 1.31 | 1.03 |
| F | 0.87 | 1.21 | 0.94 | 0.88 |
| G | 1.43 | 1.22 | 1.32 | 1.16 |
| H | 1.02 | 1.10 | 0.06 | 1.42 |
| I | 0.07 | 0.14 | 0.13 | 0.14 |
| J | 0.23 | 0.20 | 0.07 | 0.20 |
| Example 2 | 0.09 | 0.10 | 0.05 | 0.14 |
| Water-only | 0.15 | 0.13 | 0.06 | 0.13 |
| Average (of Admixtures) | 0.52 | 0.50 | 0.37 | 0.52 |
| St. Dev. (of Admixtures) | 0.61 | 0.51 | 0.53 | 0.50 |

Admixtures E, F, and G all fail ANSI specifications in all grouts for shrinkage. Admixtures, D, E, F, G, H and J all fail at least one grout for ANSI specification for shrinkage. The omniphobic water-repellant stain repellant of Example 2 does not appear to have any impact upon shrinkage based upon comparison to the water only control samples.

TABLE 9

Water-absorption (% change 28 days)

| Admixture | Grout | | | |
|---|---|---|---|---|
| | 1 | 2 | 3 | 4 |
| ANSI Specification (A118.6/A118.7) | <10/5 | | | |
| A | 3.0 | 2.9 | 2.2 | 5.4 |
| B | 6.2 | 3.0 | 2.1 | 4.1 |
| C | 7.4 | 7.0 | 3.4 | 9.0 |
| D | 16.5 | 6.8 | 2.6 | 9.9 |
| E | 2.2 | 1.8 | 1.8 | 1.9 |
| F | 7.4 | 7.6 | 4.2 | 8.2 |
| G | 3.2 | 2.6 | 2.8 | 2.8 |
| H | 2.4 | 3.6 | 2.3 | 3.6 |
| I | 5.3 | 7.0 | 4.9 | 7.9 |
| J | 7.1 | 7.4 | 3.7 | 8.9 |
| Example 2 | 3.2 | 4.5 | 3.1 | 4.9 |
| Water-only | 6.1 | 7.4 | 3.7 | 10.7 |
| Average (of Admixtures) | 5.8 | 5.0 | 3.1 | 6.1 |
| St. Dev. (of Admixtures) | 4.1 | 2.4 | 1.0 | 2.8 |

Each admixture passes the High Performance standard with at least one grout. Admixtures A, E, G, H and the omniphobic water-repellant stain repellant of Example 2 lowers the water-absorption by an average of 3.1% by weight in all grouts tested.

TABLE 10

Surface Hardness (Durometer Shore D at 28 days)

| Admixture | Grout | | | |
|---|---|---|---|---|
| | 1 | 2 | 3 | 4 |
| A | 67 | 68 | 62 | 61 |
| B | 50 | 69 | 53 | 65 |
| C | 52 | 52 | 51 | 48 |
| D | 58 | 69 | 53 | 54 |
| E | 50 | 63 | 52 | 59 |
| F | 56 | 71 | 57 | 53 |
| G | 42 | 64 | 49 | 69 |
| H | 67 | 63 | 60 | 75 |
| I | 66 | 67 | 57 | 53 |
| J | 74 | 66 | 64 | 69 |
| Example 2 | 55 | 57 | 55 | 55 |
| Water-only | 76 | 71 | 62 | 70 |
| Average (of Admixtures) | 58 | 64 | 56 | 60 |
| St. Dev. (of Admixtures) | 10 | 6 | 5 | 8 |

Each of the admixtures causes the surface hardness, as measured by Shore D Durometer, to be slightly softer by between 10 and 25%. The omniphobic stain repellant of Example 2 is within one standard deviation of the average admixture performance in each grout.

In each of the formulae presented herein, all substituents and numbers thereof are independent, and thus mixtures of various specific types of ingredients are contemplated. In all formulas of organosilicon compounds, silicon is tetravalent.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An omniphobic aqueous stain repellant grout additive, comprising:
   at least 5 weight percent based on the total weight of the additive, of ingredients (A) through (E):
   A) 1 to 30 parts by weight of at least one aminoalkyl-functional polyorganosiloxane;
   B) optionally, from up to 50 parts by weight of at least one higher alkyl alkoxysilane and/or partial hydrolysate thereof;
   C) from 20 to 30 parts by weight of at least one T-functional polyorganosiloxane resin containing alkoxy groups;
   D) from 20 to 70 parts by weight of at least one fluorocarbon compound containing at least one >$C_3$ perfluorinated group;
   E) optionally, up to 20 parts by weight of at least one film forming acrylic latex polymer;
   where the parts by weight are for each component itself in neat form, and are relative to the total amount of components A) through E), and totaling 100 parts by weight, further comprising an effective dispersion stabilizing amount of at least one surfactant, and water.

2. The omniphobic aqueous stain repellant grout additive of claim 1, wherein at least one aminoalkyl-functional polyorganosiloxane has the formula (I):

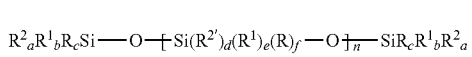    (I)

where R is an optionally chloro- or fluoro-substituted $C_{1-18}$ hydrocarbon moiety,
or a residue

$R^1$ is

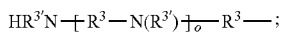

$R^2$ is —OH or —OR;
$R^{2'}$ is —OH, —OR, or (poly)siloxy, optionally substituted by $R^2$ and/or $R^1$;
$R^3$ is $C_{1-6}$ alkylene;
$R^{3'}$ is hydrogen or R;
A is $C_{2-4}$ alkylene;
X is H or $R^4$, where $R^4$ is $C_{1-18}$ alkyl;
a and c are 0, 1, 2, or 3;
b is 0 or 1;
d is 0, 1, or 2;
e is 0 or 1;
f is 0, 1, or 2;
m is 0-100;
n is 1-1000;
o is 0-10;
with the provisos that the sum of a+b+c is 3, the sum of d+e+f is 2, and at least one $R^1$ is present.

3. The omniphobic aqueous stain repellant grout additive of claim 1, wherein at least one aminoalkyl-functional polyorganosiloxane has the formula II:

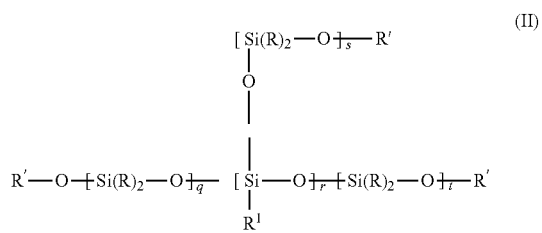    (II)

where $R^1$ is as defined previously, and R' is $C_{1-4}$ alkyl or H,
r is from 1 to 10;
q, t, and s are each, independently from 1-500; and
the sum of q, t, and s is at least 20.

4. The omniphobic aqueous stain repellant grout additive of claim 2, wherein $R^3$ is $C_{2-3}$ alkylene, $R^{3'}$ is hydrogen, o is 0 or 1, R is methyl, and $R^2$ is methoxy or ethoxy.

5. The omniphobic aqueous stain repellant grout additive of claim 3, wherein $R^3$ is $C_{2-3}$ alkylene, $R^{3'}$ is hydrogen, o is 0 or 1, R is methyl, and $R^2$ is methyl or ethyl.

6. The omniphobic aqueous stain repellant grout additive of claim 1, wherein at least one higher alkyl alkoxysilane has the formula (III):

    (III)

where
$R^5$ each independently is a $C_{3-24}$ alkyl or $C_7$-$C_{12}$ arylalkyl group;
$R^6$ each independently is $C_{1-4}$ alkyl; and
g is 1, 2, or 3.

7. The omniphobic aqueous stain repellant grout additive of claim 2, wherein at least one higher alkyl alkoxysilane has the formula (III):

    (III)

where
$R^5$ each independently is a $C_{3-24}$ alkyl or $C_7$-$C_{12}$ arylalkyl group;
$R^6$ each independently is $C_{1-4}$ alkyl; and
g is 1, 2, or 3.

8. The omniphobic aqueous stain repellant grout additive of claim 3, wherein at least one higher alkyl alkoxysilane has the formula (II)(III):

    (III)

where
$R^5$ each independently is a $C_{3-24}$ alkyl or $C_7$-$C_{12}$ arylalkyl group;
$R^6$ each independently is $C_{1-4}$ alkyl; and
g is 1, 2, or 3.

9. The omniphobic aqueous stain repellant grout additive of claim 6, wherein $R^5$ is a $C_{8-18}$ alkyl group.

10. The omniphobic aqueous stain repellant grout additive of claim 6, wherein g is 1.

11. The omniphobic aqueous stain repellant grout additive of claim 1, wherein the T-functional polyorganosiloxane is a methyl T-resin containing silicon-bonded alkoxy groups.

12. The omniphobic aqueous stain repellant grout additive of claim 1, wherein, based on 100 parts by weight of components A) through E), the amounts of components A) through E) are:
   A) 2 to 20 parts by weight,
   B) 10 to 40 parts by weight, C) 3 to 20 parts by weight,
D) 25 to 60 parts by weight,
E) 0 to 20 parts by weight,
the parts by weight of A) through e) totaling 100 parts by weight.

13. The omniphobic aqueous stain repellant grout additive of claim 1, wherein, based on 100 parts by weight of components A) through E), the amounts of components A) through E) are:
A) 2 to 15 parts by weight,
B) 20 to 35 parts by weight,
C) 4 to 20 parts by weight,
D) 25 to 50 parts by weight,
E) 5 to 20 parts by weight,
the parts by weight of A) through E) totaling 100 parts by weight.

14. The omniphobic aqueous stain repellant grout additive of claim 1, wherein at least one fluorocarbon compound is a copolymer containing polymerized fluoroalkyl(meth)acrylate and aminoalkyl(meth)acrylate moieties where the amino groups of the aminoalkyl(meth)acrylate are N-organoamine or N, N-diorganoamine groups.

15. The omniphobic aqueous stain repellant grout additive of claim 1, further comprising further additives, at least one further additive being selected from the group consisting of foam control agents, biocides, wetting agents, further stain repellant additives other than those of A) through E), cement modifiers, dyes, and pigments.

16. The omniphobic aqueous stain repellant grout additive of claim 1, wherein components A) through E) are present in an amount of from 15 weight percent to 30 weight percent based on the total weight of the omniphobic aqueous stain repellant grout additive.

17. A method for improving the stain repellancy of a hydraulically settable mineral grout composition, comprising:
adding to the grout composition, prior to application of the grout to a surface, an amount of an omniphobic aqueous stain repellant additive of claim 1 in an amount sufficient to supply at least 0.5 wt. % solids based on the sum of additive ingredients A) through E), the weight percentage calculated on the basis of dry grout solids.

18. A method for improving the stain repellancy of a hydraulically settable mineral grout composition, comprising:
adding to the grout composition, prior to application of the grout to a surface, an amount of an omniphobic aqueous stain repellant additive of claim 2 in an amount sufficient to supply at least 0.5 wt. % solids based on the sum of additive ingredients A) through E), the weight percentage calculated on the basis of dry grout solids.

19. The method of claim 17, wherein the amount of the omniphobic aqueous stain repellant grout additive added supplies 0.75 to 2 weight percent solids based on additive ingredients A) through E).

20. A process for preparing an omniphobic aqueous stain repellant grout additive of claim 1, comprising mixing ingredients A) through E) in water in any order, and dispersing the ingredients in an aqueous phase with the aid of at least one surfactant.

* * * * *

UNITED STATES PATENT AND TRADEMARK OFFICE
CERTIFICATE OF CORRECTION

PATENT NO. : 9,809,497 B2
APPLICATION NO. : 14/955441
DATED : November 7, 2017
INVENTOR(S) : Daniel J. Mania et al.

Page 1 of 1

It is certified that error appears in the above-identified patent and that said Letters Patent is hereby corrected as shown below:

In the Claims

Column 20, Lines 46-47, Claim 8:
After "has the formula"
Delete "(II)".

Signed and Sealed this
Sixth Day of March, 2018

Andrei Iancu
*Director of the United States Patent and Trademark Office*